United States Patent [19]

Maya et al.

[11] Patent Number: 5,455,484
[45] Date of Patent: Oct. 3, 1995

[54] ADAPTER FOR SIMULTANEOUSLY POWERING MULTIPLE COMPACT FLUORESCENT LAMPS UTILIZING AN ELECTRONIC BALLAST CIRCUIT

[75] Inventors: Jakob Maya, Brookline; Dominic Barbuto, Framingham, both of Mass.

[73] Assignee: Matsushita Electric Works R&D Laboratory, Inc., Woburn, Mass.

[21] Appl. No.: 307,897

[22] Filed: Sep. 16, 1994

[51] Int. Cl.$^6$ ................................................ H01J 7/44
[52] U.S. Cl. .................. 315/58; 315/71; 315/72; 315/56; 315/362
[58] Field of Search ................... 315/56, 58, 71, 315/72, 100, 362, 320

[56] References Cited

U.S. PATENT DOCUMENTS

| | | | |
|---|---|---|---|
| 4,645,283 | 2/1987 | MacDonald et al. | 315/56 X |
| 4,683,402 | 7/1987 | Aubrey | 315/56 |
| 5,015,917 | 5/1991 | Nigg | 315/56 |
| 5,128,590 | 7/1992 | Holzer | 315/58 |
| 5,202,607 | 4/1993 | Broyer et al. | 315/362 X |
| 5,365,144 | 11/1994 | Layh | 315/58 |

*Primary Examiner*—Robert J. Pascal
*Assistant Examiner*—Haissa Philogene
*Attorney, Agent, or Firm*—Jerry Cohen; Edwin H. Paul

[57] ABSTRACT

The present invention provides a base socket that fits into incandescent fixtures and allows one or many "stick" type compact fluorescent lamps to be inserted. The fixture allows the user to insert as many CFL's as desired without changing or rearranging, in any way, the ballast. The ballast circuitry is designed for series or parallel electrical connections of the CFL's. When in series each socket has a bypassing microswitch that provides for electrical circuit continuity.

6 Claims, 5 Drawing Sheets

ADAPTER FOR SIMULTANEOUSLY POWERING MULTIPLE COMPACT FLUORESCENT LAMPS UTILIZING AN ELECTRONIC BALLAST CIRCUIT

FIELD OF THE INVENTION

The present invention relates generally to adapters for compact fluorescent (CFL) lamps. More particularly this invention provides for one or more fluorescent sticks (the tubular bulbs) to be installed in various configurations into the adapter to provide for a variety of lumen outputs.

BACKGROUND OF THE INVENTION

Currently available CFL lamps are rated for a given lumen value and are manufactured accordingly. For example, the discharge path length (in effect, the tube length) of a 7 W (400 lumen) twin tube or other type compact fluorescent lamp differs from a 13 W (600 lumen) or 18 W (900 lumen) lamp. Furthermore, there are lamp that have 2 legs, 4 legs, 6 legs, etc. These lamps are manufactured differently, F, packaged and warehoused differently, and sold via different marketing channels. This plurality of lamps types and shapes is inefficient and adds cost to the CFL. For these and other reasons the CF1 has not been able to replace the incandescent lamp in the residential market in any substantial way. Part of the reason for these disparities of CFL's is, of course, due to the fact that the product is still evolving. There has not been a single product to encompass all the desirable features and become a benchmark. There is a need for a single CFL receptacle that can handle these different lamp types simultaneously.

An object of this invention is to provide a ballast adapter diameter to fit most standard harps for the table lamp applications, where the length of the entire bulb or bulbs fits most recessed lighting fixtures without the bulb sticking out and in general to have a pleasant aesthetic appearance.

It is another object of the present invention to provide a ballast adapter that can indiscriminantly accept one, two or more CFL's without anything more than just inserting the bulb(s).

Yet another object of the invention is to provide a compact fluorescent adapter amenable to a variety of lumen levels between 300–2,000 lumens giving the end user flexibility.

Still another object of the invention is to provide the end user with an inexpensive solution to energy-efficient lighting utilizing inexpensive CFL's.

SUMMARY OF THE INVENTION

The above objects are achieved in an adapter for receiving compact fluorescent lamps that includes, a hollow base with means for making electrical connections to a power source constructed on the outer surface of the base, more than one lamp socket fixed to said base, said lamp sockets arranged and constructed for receiving the electrical contacts of compact fluorescent lamps, and ballast circuitry housed within said hollow base, said ballast circuitry electrically connecting to and accepting the power source, and where the ballast circuitry converts the power source to output power signals connected to and powering all said lamp sockets.

The present invention includes an adapter with at least one fluorescent lamp connected to a lamp terminal, and where said ballast circuitry is designed to accommodate from one installed fluorescent lamp up to a number of lamps equal to the number of sockets extant.

The present invention provides a single product for a wide range of lumen values and applications. The commercial product concept is to have only one lamp of low, but acceptable, lumen value. The lamp can be manufactured in large quantities so as to make it very low cost. Then depending on the application and lumen level desired one of more, up to perhaps six for residential applications, and men for industrial applications, of these lamps could be used with the same ballast and adapter. A schematic diagram of this preferred approach is shown in FIG. 1. As shown in FIG. 1, the ballast (either an electronic or magnetic ballast circuit) is one housing able to accommodate from 1 to 6 lamps of say 300 lumen per stick. Therefore, depending on the need, once the ballast is in place one can have a light source that ranges in lumen output from 300 to 1800–2000 lumens, by simply adding more lamps into the available slots in the ballast adapter.

The ballast adapter is designed to deliver either a constant current to a series electrical arrangement of lamps or a constant voltage to a parallel electrical arrangement of lamps.

The advantages of the present invention include the following:

1) Lower research, engineering and product development costs, since each time a new lumen level is desired, no additional R&D time or money is needed to develop the product—just plug another lamp into the ballast housing.

2) Lower Equipment Development Costs: A new product, say with 3 or 4 legs, typically requires the capital expense of a new machine. With the present invention, however, the only time a new investment would be required is when installed capacity to make the one kind of CFL is not sufficient to meet the demand. At that point a new machine can be built, based on the same existing CFL design.

3) Lower Manufacturing Cost: Due to the fact, as mentioned above, that there will be only one product made in high volume manufacturing costs are low. Manufacturing cost increases are due to tooling changeovers to different products, down time of machines, scrap and shrinkage etc. All these would be substantially eliminated in the one product approach.

4) Lower Warehousing Costs: Since only one product is to be warehoused the space requirements are far less resulting in lower warehousing costs.

5) Lower Packaging Costs: Only one product in larger quantities need to be packaged. Design, printing and overall packaging costs, all will normally be lower.

6) Lower Transportation Costs: The form factor of one product makes it easier to fit into the transportation space available.

7) Lower Accounting, Administration and Sales Costs: Keeping track of the accounting and the sales and distribution activities are costly. Reducing these activities from, say 10–12 products to just 1, will substantially lower these costs.

8) Lower cost associated with errors of use of all kinds. Ordering, shipping and replacing the wrong lamp style will be eliminated thus reducing those costs and associated problems (such errors aggravate users and suppliers inducing loss of good will, etc.).

Other objects, features and advantages will be apparent from the following detailed description of preferred embodi-

DESCRIPTION OF THE PREFERRED EMBODIMENTS

Figure 1:
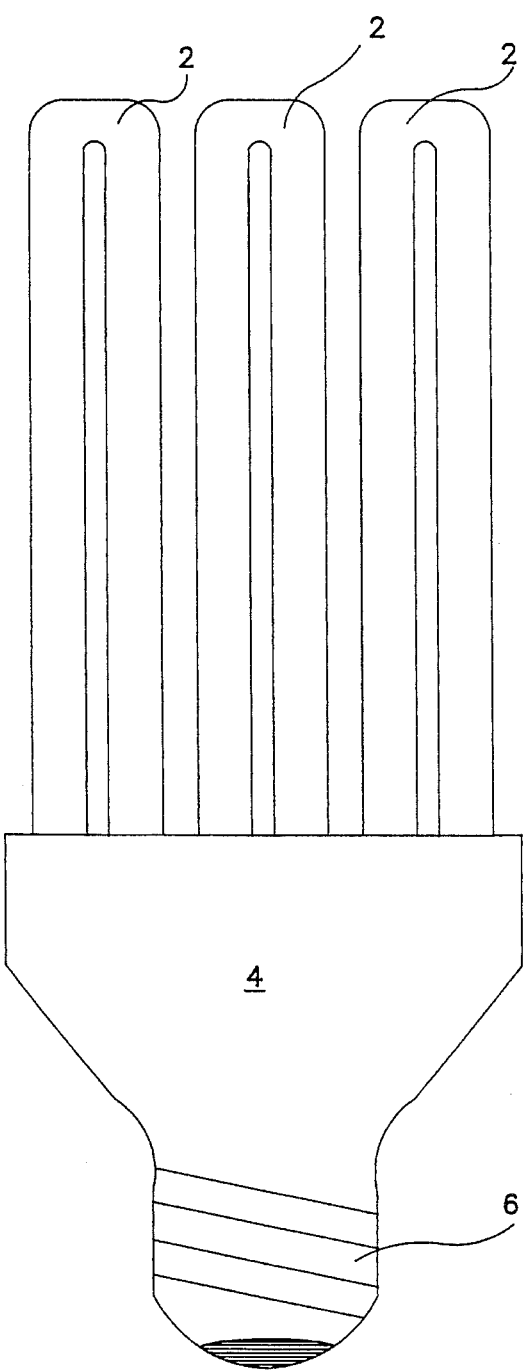
FIG. 1 is a pictorial of a preferred embodiment of the adapter of the present invention.
Figure 2:
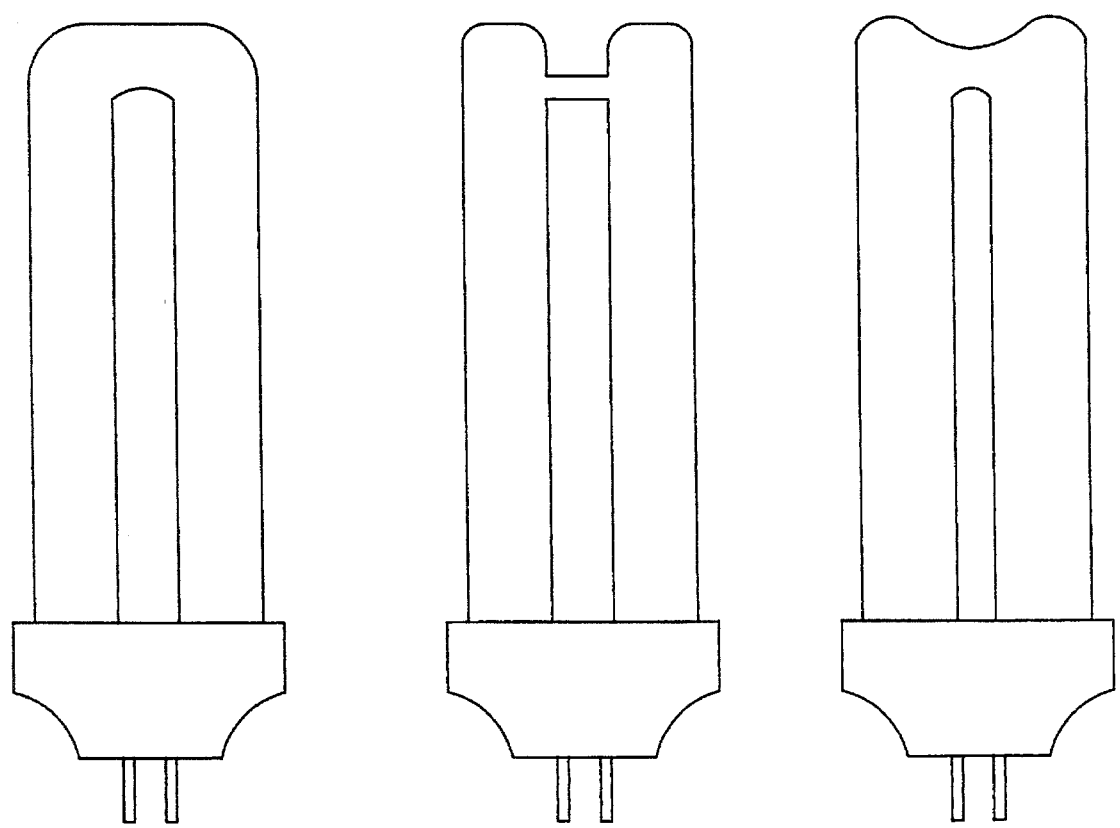
FIG. 2 is a pictorial view of different forms of fluorescent lamps used with the present invention.

FIG. 1 shows the particular configuration of the stick type fluorescent lamps 2 inserted into a base adapter 4. The adapter has a screw-type electrical power fitting 6 that matches the typical incandescent bulb receptacle. The ballast circuitry needed to drive fluorescent lamps is constructed within the hollow adapter base. The particular construction of the lamps is an issue of aesthetics and design which can be resolved in a variety of ways. Several of the commercially available, "U" shaped, fluorescent stick type lamp configurations are shown in FIG. 2. These are not meant to be exhaustive, but only examples; many other configurations can be provided by those skilled in the art of light source design and engineering. Note that the stick type lamps used in our particular embodiment are of the bi-pin type, commonly found in all markets around the world, which contains a bimetallic starter and a capacitor in the base of the lamp. A different circuit would have to be used if a four pin type of lamp is to be used (where a bimetallic starter is not included).

Figure 3:
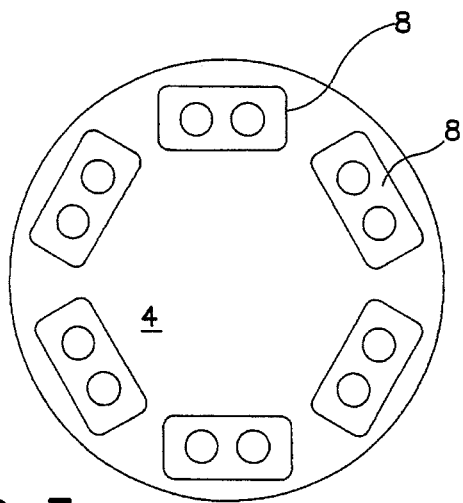
FIG. 3 is a top view of the adapter of FIG. 1 less the fluorescent lamps.
Figure 4A:
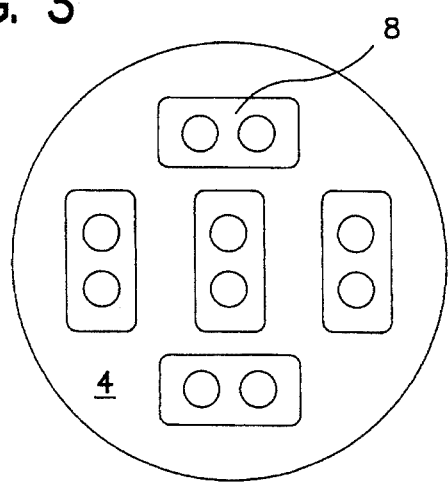
FIG. 4A and FIG. 4B are top views, similar to FIG. 3, of alternative arrangements of the lamp sockets.
Figure 4B:
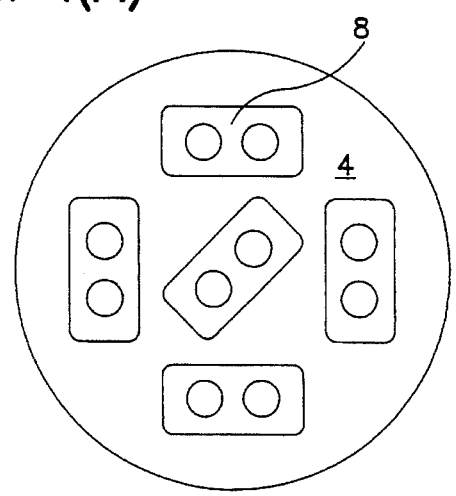
Figures 5, 6:
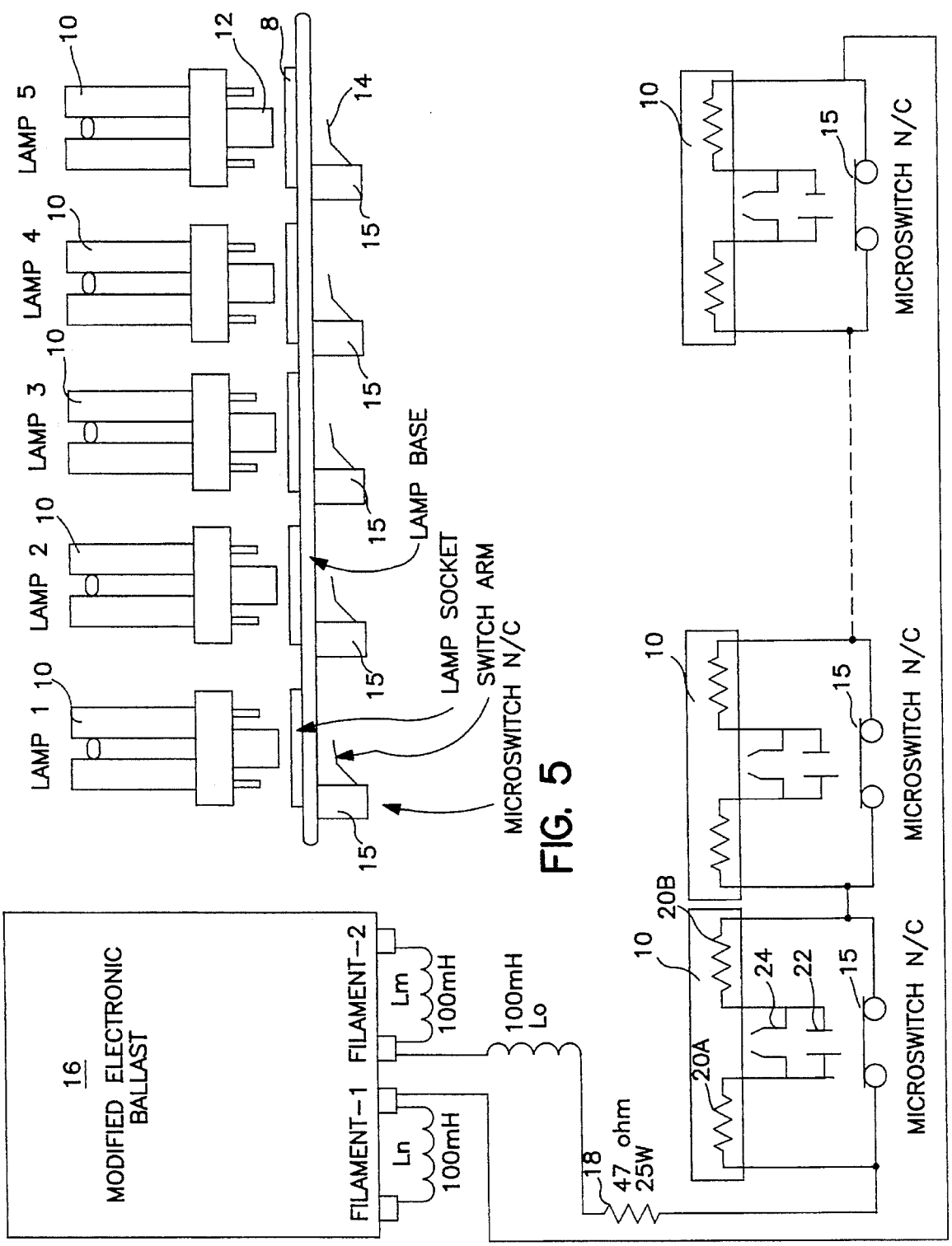
FIG. 5 is a functional/block diagram of the lamps and sockets of a preferred embodiment.
FIG. 6 is a schematic of the electrical connections to implement FIG. 5.

In FIG. 3, six sockets 8 are arranged in a circle, in this preferred embodiment. FIG. 4 and FIG. 5 show other configurations of five sockets, and other such arrangements can be made within the present invention The number of "U" shape lamp units that can be inserted into the universal ballast housing can vary from 1 to 10 lamps or more depending on the application and the size of the housing. Furthermore, the particular configuration of the lamps relative to each other can be changed to accommodate any particular configuration as one skilled in the art might design. In other words, while one design may place the lamps parallel to each other, other designs may place them perpendicular to each other or around in a circle as shown in FIG. 1.

Furthermore, the present invention accommodates lamps of different lumen value. This is important since different countries manufacture fluorescent lamps of different lumen values. While one country may produce individual lamps of 300 lumens and favor 300 lumen increments, for example, 600 900, 1200, 1500, 1800 and so on lumens; other countries or markets may prefer increments of 200 lumens or for that matter 400 lumens. Therefore the individual lamp would be 200 lumens or 400 lumens. A preferred embodiment of the present invention accommodates the use of a combination of lamps each of different lumen value, for example, a 200 lumen, 300 lumen and 400 lumen or any other value lumen lamp inserted into the same ballast housing.

As is well known one can connect all lamps in parallel. In this arrangement a constant voltage is applied across each lamp. The ballast circuitry, discussed later, must accommodate from one to all say, six lamps. This requires that the constant voltage generating ballast circuitry must have the current capability or compliance to support the current needs of all the lamps. In the series connection the ballast circuitry drives a constant current through all five lamps. In this case the ballast circuitry must comply by having the voltage capability to support all five lamps installed. Another aspect of this series connection is the need to complete the electrical circuit when only one lamp is installed.

FIG. 5 shows five CF lamps. The base 12 of each lamp, when the lamp is inserted into the socket 8, extends through an opening in the socket and strikes the arm 14 of normally closed (N/C) microswitch 15, at the same time the lamp will complete series circuit allowing current to flow through it. When the lamp is removed, the circuit is complete through the now closed microswitch. In this way the circuit will run one, two or up to five lamps. Without the microswitches, removal of one lamp would prevent any of the other lamps from lighting, and, more importantly, a high voltage would appear across the ballast output contacts.

FIG. 6 shows the circuit connections of FIG. 5 in more detail. Ballast circuitry 16 outputs power to the lamps 10 via Lm and Ln, both 100 µH inductors. Lm extends through Lo, another 100 µH inductor, through a forty-seven ohm, 25 W resistor 18. and then to the series of lamps 10. The fluorescent lamps, in this preferred embodiment, each have two sticks or tubes that are joined together near the top. Each stick is electrically represented as a resistor, 20A and 20B, where these resistors are joined via a capacitor 22 and a bimetal strip 24. The microswitches, normally closed contacts 15, short out each lamp.

Figure 7:
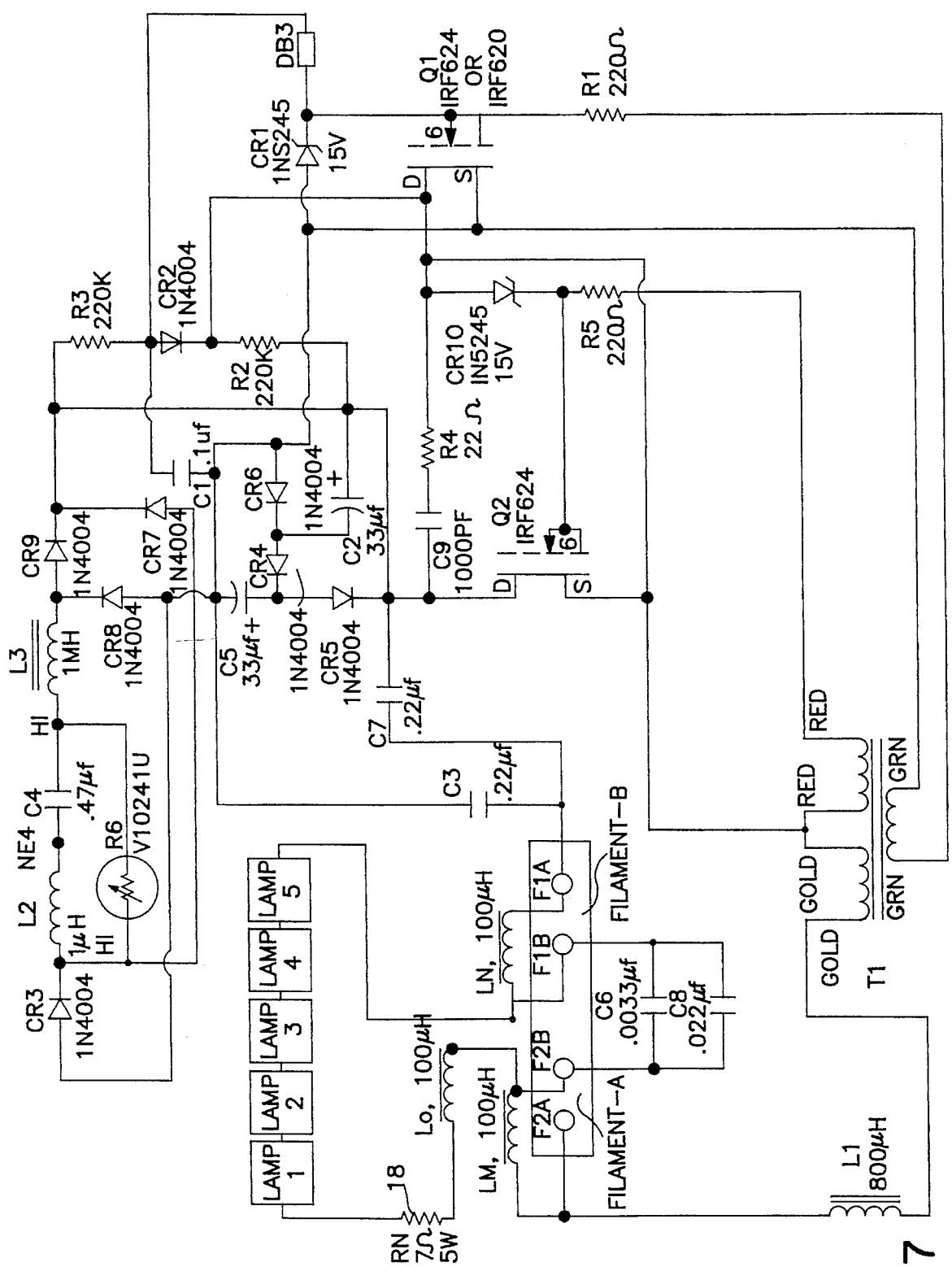
FIGS. 7 and 8 are schematics of preferred adapter ballast circuits for a series connection of lamps.

An electronic ballast circuit suitable to drive the series assembly of FIG. 6 is shown in FIG. 7. This circuit includes an inductance to each of the filament circuits (as shown also in FIG. 6 as Lm and Ln. The values of these are not very critical, however, we found it convenient to use 100 µH for a 4 lamp and/or 5 lamp assembly. The combination of a kick from these inductors combined with the bimetallic starter (24 of FIG. 6) in each of the lamps is sufficient to ignite the lamps. Now, since the circuit is designed to operate with either 1 lamp or up to 5 lamps in any combination, there was need to limit the current, so that, when only one lamp is present, there is no excessive power on that lamp. Over powering a lamp substantially reduces its life. This was accomplished by limiting the current with the Lo=100 µH inductor in series with the 47 ohm resistor 18. In other preferred embodiments, the current was limited using just an inductor or a capacitor. However, best results were achieved using a resistor and an inductor. With the series connection of lamps as in FIG. 6, the amount of power dissipated in the resistor 18 is very small when all the lamps are present, while it could be several watts when only one lamp is present.

The circuit configuration of FIG. 6 supports up to five 5 watt (W) fluorescent lamps. The power to each lamp is approximately 4.5 W (with all five fluorescent lamps in place) and 8 W (with only one). Further circuit refinement using an automatic gain control or current control circuit, not shown but known in the art, to achieve power levels of 5 W, 7 W or other power levels needed to run other particular lamps can be employed.

Although using mechanical microswitches attached right next to the sockets works well, there are many other approaches where the removal of one lamp does not disturb the performance of the remaining lamps. These could include the use of photocells, photo transistors, and other photo or mechanical devices that recognize the absence of light from a lamp position or the absence of the physical lamp provide a signal useful for accommodating missing lamps. Such use and techniques are known in the art.

In the series connection of the lamps, one problem is that when one lamp fails in an open circuit manner (e.g. by a broken filament) none of the lamps will light. The failed lamp is found by removing each lamp in turn, each time trying to light the remaining ones. Only when the defective lamp is removed from the adapter will the other lamps light up.

Figure 8:
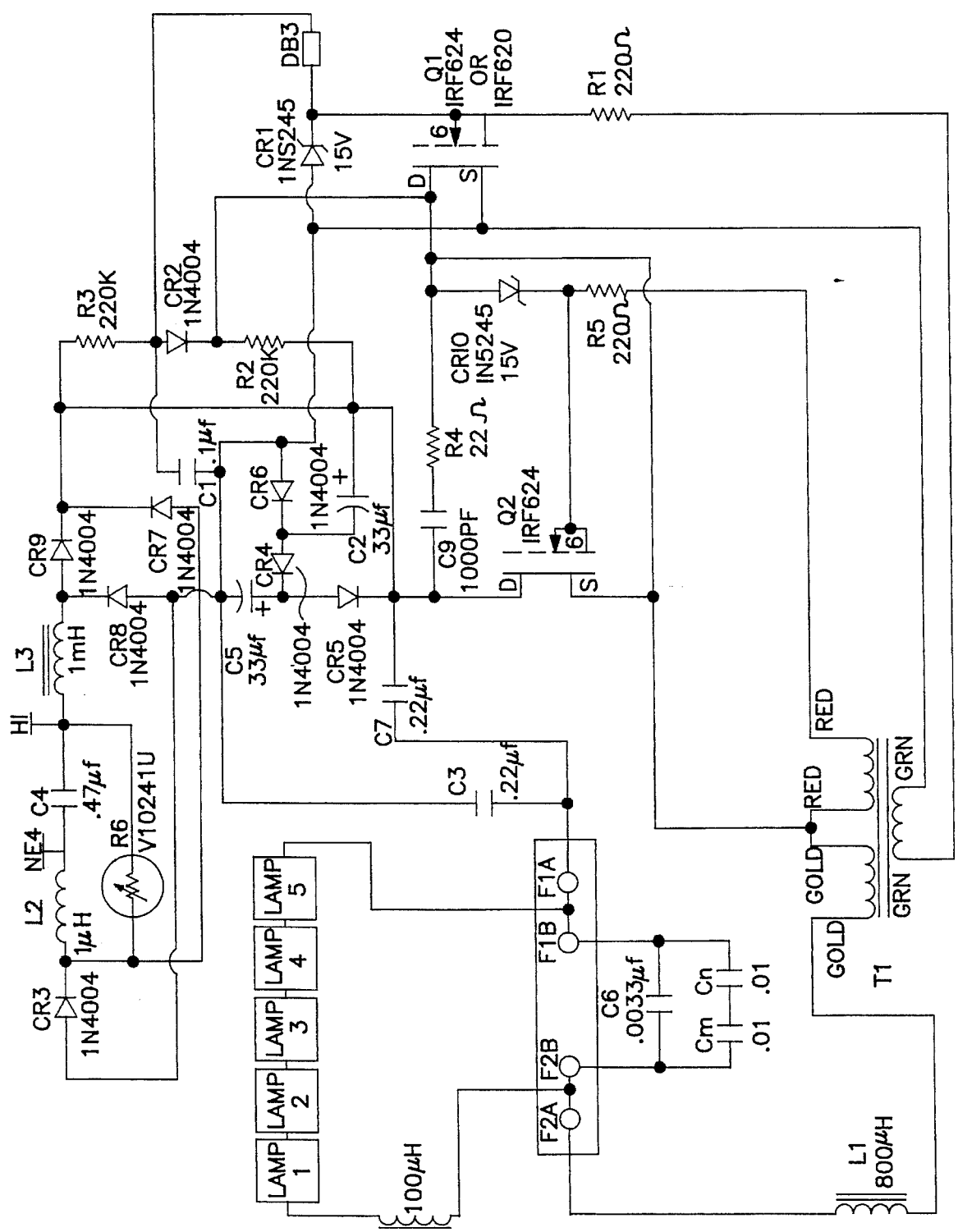

Another preferred embodiment ballast circuit is shown in FIG. 8. Here the 47 ohm resistor 18 and the inductors Lm and Ln are eliminated, and C8 is replaced by capacitors Cm and Cn. With this circuit there is no power loss in the resistor increasing power efficiency and reducing heat sinking needs. In addition, less space is used providing a more compact adapter.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. An adapter for receiving fluorescent lamps, the lamps having electrical contacts, comprising:

a hollow base with means, constructed on the outer surface of the base, for making electrical connections to a power source, more than one lamp socket fixed to said base, each of said lamp sockets arranged and constructed for receiving the electrical contacts of the fluorescent lamps, where said lamps include a range of lamps having the same power rating to lamps having all different power ratings, and ballast circuitry housed within said hollow base, said ballast circuitry electrically connecting to the power source, and where the ballast circuitry converts the power source to output power signals simultaneously connected to and powering all said lamp sockets.

2. An adapter as defined in claim 1 further comprising at least one fluorescent lamp connected to a lamp socket, and wherein said ballast circuitry is designed to accommodate from one installed fluorescent lamp up to a number of lamps equal to the number of lamp sockets extant.

3. An adapter as defined in claim 2 wherein said ballast circuitry comprises means for accommodating fluorescent lamps of different power ratings, and where said lamp sockets are constructed with contact pins of a number and physical arrangement to match the fluorescent lamp electrical contacts.

4. An adapter as defined in claim 1 wherein said ballast circuitry is arranged to connect to and power all said lamp sockets, where the electrical connections of the lamp sockets form a serial circuit, and where said adapter further comprises normally closed electrical switches, one such switch constructed at each lamp socket, said switches arranged to short out each socket, and further where the switches include a mechanical activation arm positioned to physically contact the lamp inserted into the corresponding socket, where the lamp activates the switch such that the switch opens allowing the lamp to be powered.

5. An adapter as defined in claim 1 wherein the ballast circuitry further comprises means to photo-electrically detect the presence of a lamp in each socket and to energize each said detected lamp, while in the absence of a lamp said ballast circuitry provides a short circuit across each empty socket.

6. An adapter as defined in claim 1 wherein said ballast circuitry is arranged to connect to and power all said lamp sockets, where the electrical connections of the lamp sockets form a serial circuit, and where said adapter further comprises normally closed electrical switches, one such switch constructed at each lamp socket, each of said switches arranged to short out each corresponding socket when no lamp is installed and to power each socket when a lamp is installed, and further where each switch includes photo-electric means to detect the absence of a physical lamp in the corresponding socket.

* * * * *